Patented Jan. 27, 1953

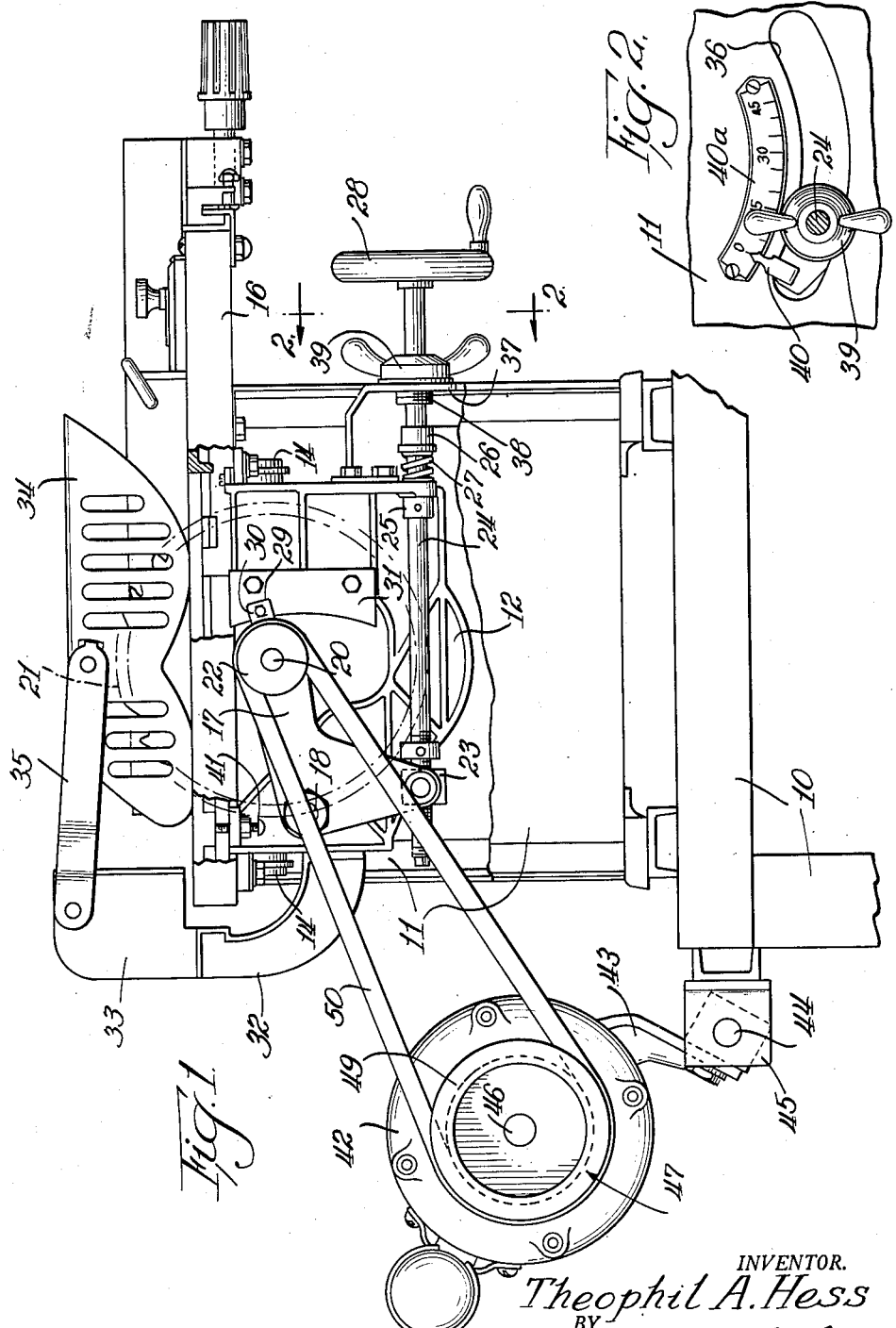

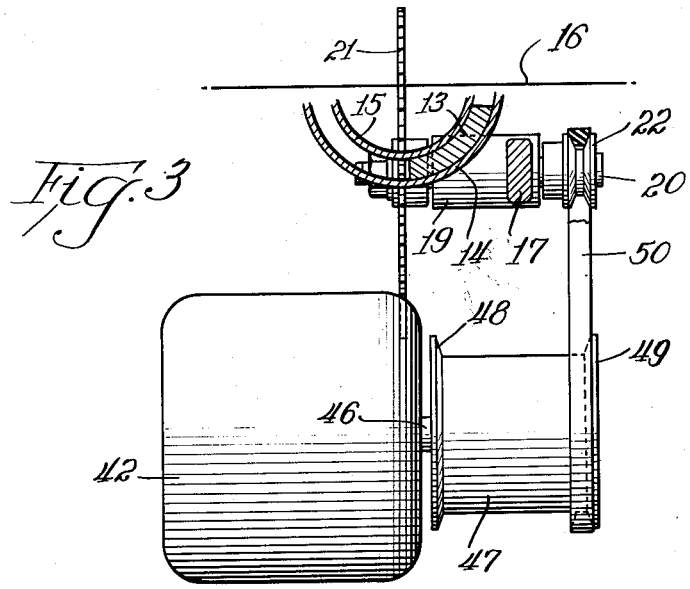
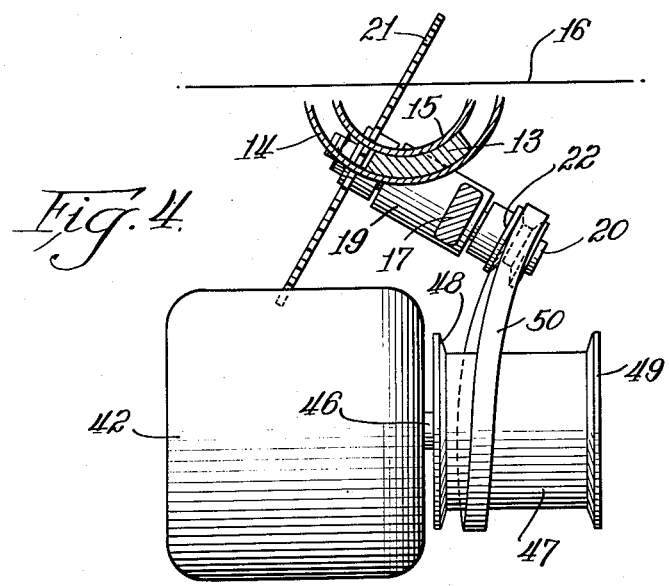

2,626,639

UNITED STATES PATENT OFFICE 2,626,639

BELT AND PULLEY DRIVE MEANS FOR TILTABLE SAWS AND THE LIKE

Theophil A. Hess, Chicago, Ill., assignor to Duro Metal Products Co., Chicago, Ill., a corporation of Illinois Application November 4, 1950, Serial No. 194,149

2 Claims. (Cl. 143—36)

This invention relates to power machines, such as a table saw, in which means is provided for tilting the saw blade and its arbor, or other operating tool, with respect to the table along which a work piece is movable into contact with the tool, as well as in relationship to the prime mover which drives the tool.

A general object of the invention is to provide a new an improved construction in a machine of this type, and particularly, a new and improved structure for the driving means by which power is transmitted from a motor supported by the table structure to an angularly adjustable arbor and the tool carried thereby.

Another of the objects of my invention is to provide an improved structure for effecting belt alignment and proper belt tension for power tools in which power is transmitted through an endless V-belt to the adjustably mounted tool from a motor carried by a supporting structure, and wherein the V-belt is twisted as the arbor of the tool is set to its selected angular position with respect to the supporting structure. In my improved construction, the V-belt has engagement with the side faces of the side flanges of a V-pulley mounted on the adjustable arbor, and normally engages the inner face of one flange of a driving pulley mounted on the driving motor shaft during the operation of the saw and when the saw is in a position at right angles to the face of the table.

My disclosed structure is such that at substantially the start of the tilting of the saw blade into oblique relationship to the top face of the saw table, the side face of the V-belt is moved away from the inner face of the driving pulley on the motor, and that the V-belt thereafter, during the operation of the saw in tilted position, engages the driving pulley at only the inner face of the belt. For insuring effective driving of the saw blade during operation in the tilted position, a comparatively large driving pulley has been employed on the motor so as to obtain the required frictional engagement with the belt. The construction is such, also, that as the belt moves away from the position at which its side face has engagement with the driving pulley flange, the tension of the belt is increased so as to compensate, at least in part, for the reduction in the extent of the engagement of the belt with the drive pulley.

It is a further object of my invention to provide an improved driving means for power tools in which two oppositely disposed pulleys and a V-belt operating thereon may be utilized, and in which one of said pulleys is provided with a V-groove and is movable into changed axial position angularly with respect to the axis of the other pulley, and which other pulley, in turn, is elongated axially so as to permit the V-belt to shift therealong to maintain effective driving alignment as the pulleys are adjusted angularly with respect to each other. In my preferred ensemble, the elongated pulley is provided with a circumferential flange at one end, with which the side face of the V-belt engages when the saw blade is standing in a position at right angles to the face of the saw table. By the use of this construction, effective starting and driving is insured while the saw blade is standing in its vertical position.

Other objects and advantages will be apparent, also, from the following description of an exemplary embodiment of my invention, disclosed for illustrative purposes by reference to the accompanying two sheets of drawings, in which:

Fig. 1 is a side face view of a table saw provided with my improved construction and mounted on a suitable stand which carries, in addition, the motor by which my improved saw is operated;

Fig. 2 is an end face view of a fragmentary portion of the machine as seen at line 2—2 in Fig. 1;

Fig. 3 is a view partly in section, showing diagrammatically the means for adjustably supporting the saw blade and its associated parts in position with respect to the motor and the means for driving the blade by power from the motor; and Fig. 4 is a view similar to Fig. 3, but showing a changed position of certain of the parts when the saw blade is adjusted out of its vertical position.

Referring now to the several figures of the drawings, 10 indicates a supporting stand of any approved type, with the framework 11 of a table saw mounted thereon. In my improved arrangement, a supporting plate 12 is mounted swingingly in position by means of arms 13 at opposite ends of the plate, such arms including segmental portions in engagement with arcuate cradle bearings 14, and being held in position by top bearing members 15; the arrangement being such that said supporting plate is adapted to swing about a transverse horizontal axis substantially at the top face of a table 16 mounted on said framework 11. At one face of the plate 12, I have provided a bell-crank lever 17 pivotally mounted in position by means of a bolt 18. On the end of the horizontal arm portion of the lever 17, I have provided a spindle bearing housing 19 in which a spindle or arbor 20 is rotatably mounted for carrying a circular saw blade 21, the spindle being provided with a V-belt pulley 22 fixedly mounted on its end portion opposite the saw.

The construction is such that the saw blade 21 may be raised or lowered with respect to the supporting plate 12 by a swinging movement of the lever 17. Such swinging movement of the lever is effected through the medium of a nut 23, pivotally connected with the lower arm of said lever and engaging a threaded shaft 24 which is rotatably mounted on the supporting plate 12. With the shaft 24 held normally in fixed position, longitudinally of the supporting plate 12, as by collars 25 and 26, and an interposed coiled spring 27, rotary movement of the shaft by means of a hand wheel 28 serves to move the nut 23 and thus to swing the lever for moving the spindle or arbor 20 upwardly or downwardly about the axis of the bolt 18. A lug 29 is provided on the bearing housing 19 which carries a set screw 30, engaging the face of a guide plate 31 on the supporting plate 12 for reinforcing and guiding the bearing housing 19 with respect to the supporting plate.

On the supporting plate 12, I have provided a bracket 32 having a split-plate 33 mounted thereon, with a saw guard 34 movably supported by links 35 from such split-plate.

For swinging the supporting plate 12 on its longitudinally extending axis with respect to the framework 11, and for locking the plate releasably in adjustable position with respect to such framework, I have extended the shaft 24 through an arc-shaped slot 36 in the end wall portion of the framework, as shown in Fig. 2, and have provided means for locking the rod in adjusted position with respect to said slot. This locking means comprises a bracket 37 mounted on the supporting plate 12 and extending into position adjacent to the inner face of the end wall of the framework with its end portion serving as a nut engaging a hollow screw 38 mounted loosely on the rod 24 at the outer face of the end wall of the framework; said screw 38 being provided with a thumb-nut head portion 39 adapted to be tightened against the end wall for holding the rod 24 in fixed position with respect to the slot 36. A pointer 40 mounted on the bracket 37 cooperates with a graduated scale 40a on the end wall above the slot 36 for showing the degree of angular adjustment of the saw blade 21 with respect to the table 16.

A set screw 41 carried by the supporting plate 12 is adapted by engagement with the table 16 to limit the swinging movement of the supporting plate to its normal operative position at which the saw blade stands at right angles to the table.

For driving the arbor 20, I have provided an electric motor 42 mounted for swinging movement about an axis spaced from one side of the motor housing and relative to the stand 10 by a bracket 43 having trunnions 44 at its opposite ends rotatable in projecting ears or lugs 45 on said stand. A driving shaft 46 of the motor has an axially elongated pulley 47 mounted thereon, of relatively large diametrical size, such pulley 47 being cylindrical in shape with peripheral end flanges 48 and 49 at its ends. An endless V-belt 50 is trained about the pulleys 22 and 47, which belt is of a length such that it supports the motor with its center of gravity above the trunnions 44 and to the side thereof away from the arbor 20, as seen in Fig. 1, so that the endless belt supports the motor and is tensioned by a downward component of the motor weight, thus maintaining the belt in an operatively tightened condition.

In the use of my improved structure, when the arbor 20 is maintained in its horizontal position, as shown in Fig. 3, the side faces of the V-belt 50 engage the V-groove of the pulley 22, while the inner face of the belt engages the cylindrical surface of the pulley 47, and the outer side face of the belt engages the flange 49 of that pulley. When, however, the arbor is shifted to an angular position with respect to the saw table 16 and motor shaft 46, as shown in Fig. 4, the belt 50 is caused to move along the cylindrical surface of the pulley 47 away from engagement with the flange 49 and into effectively aligned relationship to the changed position of the pulley 22. As the V-pulley on the arbor drops due to such adjustment of the arbor position, the motor position also drops so as to increase the effective belt tensioning component of the weight of the motor, thus serving at all times to keep the belt properly tightened for driving, and increasing the belt tension as the angle between the driving and driven axes is increased. With the pulley 47 of relatively large diametrical size, effective frictional engagement between the belt and the driving pulley 47 is additionally insured. When the parts are in the positions shown in Fig. 3, the belt has very little, if any, greater tendency to slip with respect to the pulley 47 than with respect to the V-groove pulley 22, and when the parts are in the positions shown in Fig. 4, the frictional engagement between the belt and the pulley 47 is still maintained at a high level for insuring effective driving, as a result of the increase in belt tension as the belt moves away from the driving pulley flange.

My construction is such that the operation of moving the arbor into angled position from the horizontal can be performed readily and quickly, without any danger that the belt shall be displaced from operative position on either of the pulleys, and that effective driving shall be maintained in the various adjusted positions at which the arbor may be secured.

While I have illustrated a preferred embodiment of the invention, many modifications may be made without departing from the spirit of the invention, and I do not wish to be limited to the precise details of construction set forth, except so far as the same may be specifically claimed, but desire rather to avail myself of all changes within the scope of the appended claims.

Having thus described my invention, what I claim as new and desire to secure by Letters Patent of the United States is:

1. In a drive mechanism for power tools and the like having a supporting frame and a work table, the combination comprising a tool carrying arbor supported for rotation and for axial tilting movement to adjusted positions in a plane substantially perpendicular to the work table, a V-pulley secured to the arbor, a motor having a drive shaft substantially parallel to said plane and supported relative to the supporting frame for swinging movement toward and from the arbor about an axis positioned below the drive shaft and in a vertical plane lying between vertical planes containing the drive shaft and the arbor, said drive shaft having a driving pulley mounted thereon, a V-belt providing a driving connection between the driving pulley and the V-pulley and being of a length to support the motor at a position above the axis of swinging movement thereof and to the side of the last mentioned axis away from the arbor, whereby a component of the weight of the motor tensions the belt relative to the V-pulley, said driving pulley comprising an elongated cylindrical belt engageable surface whose axis is of substantially greater length than the width of said belt and a belt confining flange at each end thereof, said motor and driving pulley being so aligned with the V-pulley that the V-belt engages one of the end flanges of the driving pulley when the arbor is in a normal position parallel to the work table and moves away from said one of the end flanges and along the elongated cylindrical surface of the driving pulley when the arbor is tilted from said normal position.

2. In a drive mechanism for power tools and the like as defined in claim 1, and wherein the axis of the arbor and V-pulley is normally at a level above the axis of the drive shaft and driving pulley, and the direction of tilting movement of the arbor from the normal position of parallelism with the drive shaft being such that the V-pulley is moved downwardly toward the level of the driving pulley, thereby effecting swinging movement of the motor away from the vertical plane of the axis about which swinging movement takes place and increasing the belt tensioning force.

THEOPHIL A. HESS.

REFERENCES CITED

The following references are of record in the file of this patent:

UNITED STATES PATENTS

| Number | Name | Date |
|---|---|---|
| 366,633 | Mackintosh | July 12, 1887 |
| 553,009 | Luther | Jan. 14, 1896 |
| 963,697 | Dyer | July 5, 1910 |
| 1,922,151 | Bocie et al. | Aug. 15, 1933 |
| 2,121,069 | Collins | June 21, 1938 |
| 2,168,282 | Tautz | Aug. 1, 1939 |
| 2,265,408 | Tautz | Dec. 9, 1941 |
| 2,367,267 | Dawson | Jan. 16, 1945 |
| 2,530,290 | Collins | Nov. 14, 1950 |
| 2,547,940 | Hearn | Apr. 10, 1951 |